(12) United States Patent
Braun et al.

(10) Patent No.: US 9,064,076 B1
(45) Date of Patent: Jun. 23, 2015

(54) USER INTERFACE FOR FACILITATION OF HIGH LEVEL GENERATION OF PROCESSOR EXTENSIONS

(75) Inventors: Gunnar Braun, Aachen (DE); Frank Fiedler, Aachen (DE); Andreas Hoffmann, Herzogenrath (DE); Gideon Intrater, Sunnyvale, CA (US); Olaf Lüthje, Wurselen (DE); Achim Nohl, Aachen (DE); Ludwig Rieder, Kohlberger Str. (DE)

(73) Assignees: Synopsys, Inc., Mountain View, CA (US); MIPS Technologies, Inc., Mountain View, CA (US)

( * ) Notice: Subject to any disclaimer, the term of this patent is extended or adjusted under 35 U.S.C. 154(b) by 582 days.

(21) Appl. No.: 11/388,484

(22) Filed: Mar. 23, 2006

(51) Int. Cl.
*G06F 17/50* (2006.01)

(52) U.S. Cl.
CPC .................................... *G06F 17/505* (2013.01)

(58) Field of Classification Search
CPC .............. G06F 17/505; G06F 17/5045; G06F 17/5022; G06F 17/5068; G06F 17/5054
USPC ..................................................... 716/18, 104
See application file for complete search history.

(56) References Cited

U.S. PATENT DOCUMENTS

| | | | | |
|---|---|---|---|---|
| 6,691,301 | B2 * | 2/2004 | Bowen | 717/114 |
| 7,062,724 | B2 * | 6/2006 | Nakajima | 716/1 |
| 7,065,719 | B2 * | 6/2006 | Nakajima | 716/1 |
| 7,206,732 | B2 * | 4/2007 | Williams et al. | 703/22 |
| 2001/0034876 | A1 * | 10/2001 | Panchul et al. | 716/18 |
| 2005/0049843 | A1 * | 3/2005 | Hewitt et al. | 703/14 |
| 2005/0160402 | A1 * | 7/2005 | Wang et al. | 717/114 |
| 2005/0166038 | A1 * | 7/2005 | Wang et al. | 712/226 |
| 2005/0193184 | A1 * | 9/2005 | Kohno et al. | 712/1 |
| 2006/0212863 | A1 * | 9/2006 | Warnes | 717/159 |

* cited by examiner

*Primary Examiner* — Vuthe Siek
(74) *Attorney, Agent, or Firm* — Fenwick & West LLP

(57) ABSTRACT

Systems and methods of user interface for facilitation of high level generation of processor extensions. In accordance with a method embodiment of the present invention, an instruction format is accessed at a graphical user interface. A programming language description of a computation element for an execution unit of the processor extension is accessed. A representation of a hardware design for the processor extension comprising the instruction format and the computation element is generated.

33 Claims, 8 Drawing Sheets

| Instruction | Format | S | T | D | HI | LO | Immediate | Opcode | Description |
|---|---|---|---|---|---|---|---|---|---|
| Clipping | R N N Imm + W | S | | | | | 15 | | All clipping instruction |
| CLIP | Enabled | | | | | | 88 | 0 | Truncates a value max 88 |

450 uint16 index = UDI_RS;
uint16 bound = UDI_IMM;

if ( index < 0 ) index = 0;
else if ( index > bound ) index = bound;

UDI_WRITE_GPR ( index );

FIG. 4B

400 if ( index < 0 ) index = 0;
else if ( index > bound ) index = bound;

FIG. 4A

USER INTERFACE FOR FACILITATION OF HIGH LEVEL GENERATION OF PROCESSOR EXTENSIONS

BACKGROUND OF THE INVENTION

1. Field of the Invention

Embodiments of the present invention relate to tools for the automated design of computer processor architectures.

2. Related Art

In contrast to general purpose computer systems, e.g., a desktop computer, which generally utilize a stand-alone microprocessor integrated circuit, the vast majority of computer-controlled or operated systems, e.g., mobile phones, hand held computers, electronic gaming machines, digital cameras, digital music players, embedded controllers and the like, utilize a form of integrated circuit known as or referred to as a system on a chip, or application specific integrated circuit (ASIC). In addition to a microprocessor or microcontroller, such an application specific integrated circuit typically comprises additional circuitry related to the function it is to perform, for example, for a mobile phone application, a system on a chip may comprise a digital signal processor and a display controller in addition to a microprocessor.

The design of such a system on a chip is greatly aided by the availability of "off-the-shelf" blocks for major functions. For example, well-known microprocessors, e.g., a variety of microprocessor cores, commercially available from MIPS Technologies, Inc. of Mountain View, Calif., under the trademark MIPS® Pro Series, are available as "IP blocks" (intellectual property blocks). Many other processors and functions are available as IP blocks from a wide variety of suppliers. An ASIC designer is able to combine such IP blocks to create a customized integrated circuit targeted to a specific application.

The providers of programmable intellectual property blocks, for example, blocks that implement a programmable function, e.g., microprocessors and digital signal processors, are increasingly enabling their customers, e.g., ASIC designers, to enhance the instruction sets of such processors. By adding instructions to a base set of instructions, an ASIC designer may be able to beneficially improve execution of complex algorithmic kernel functions characteristic of the application, e.g., digital audio playback.

For example, based on application profiling results of the main central processing unit (CPU), a designer is able to identify time-critical "hot-spots" of an application. Such "hot-spots" are analyzed and partly transformed into a special purpose instruction hardware implemented by the designer. In contrast to traditional co-processors, such custom instruction-set extensions are seamlessly integrated into the main CPU's software flow. Thus, from an embedded software developer's perspective, the instruction-set extensions appear as being a part of the main CPU.

In terms of hardware, the instruction-set extensions are usually implemented in a separate extension module that is tightly coupled to the main CPU via a well defined pin interface. To ensure tight coupling between the extension module and the CPU, the extension module can have access to the main CPU's internal resources, e.g., registers, accumulators and the like.

In contrast to a processor or co-processor, an extension module generally does not have an internal program memory. Rather, the special purpose instructions for the extension module are obtained from the main CPU instruction flow via a pin interface. This arrangement allows scheduling and synchronization of the extension instructions with the CPU instruction set. For example, this arrangement enables cache coherency or other data hazards to be taken into account.

Extension modules commonly have a private pipeline so as to not slow down the main CPU clock. However an extension module may implement multi-cycle instructions that signal a pipeline stall to the main CPU.

Unfortunately, in most cases under the conventional art, such instruction set extensions and the supporting software development tools are designed manually, with a very low degree of automation or support from design tools. Thus, the design of instruction set extensions and the supporting software development tools is generally viewed as a long, skilled-labor-intensive and risky process, requiring numerous highly skilled engineers with specialized processor design knowledge. Such designers are generally required to have a deep understanding of processor architectures, knowledge of hardware description language (HDL) and a good understanding of software tool development.

For example, the conventional art generally requires use of a register transfer level (RTL) design of signal interface and signal timing, an RTL implementation of the data-path and instruction decoder, design of the instruction pipeline, the implementation of functional, cycle and pin accurate simulation models, and the creation of configuration files for a third party software tool-chain.

Other embodiments of the conventional art are capable of automatically generating some or all of the aforementioned design and/or simulation elements. However, such embodiments generally rely upon a description of the extension in RTL, or a meta language characterized as requiring about the same level of design detail as RTL, and requiring about the same level of circuit design expertise as RTL.

Such complexity and technical challenges generally prohibit the most likely target user, a software designer, from creating such custom instructions. For example, it is usually during a software development process, e.g., after at least preliminary design of a system on a chip and simulation of a software application, that opportunities for the benefits of custom instructions become apparent. However, typically software designers do not have the skill set necessary to design and/or implement such extensions. Consequently, for these multiple reasons, the benefits of custom instructions are rarely enjoyed under the conventional art.

SUMMARY OF THE INVENTION

Accordingly, systems and methods of user interface for facilitation of high level generation of processor extensions are needed. In addition, systems and methods of user interface for facilitation of high level generation of processor extensions that abstract the register transfer level (RTL) implementation details would be advantageous. Further, systems and methods of user interface for facilitation of high level generation of processor extensions that are compatible and complimentary with conventional integrated circuit design tools and methods are highly desired.

Systems and methods of user interface for facilitation of high level generation of processor extensions are disclosed. In accordance with a method embodiment of the present invention, an instruction format is accessed at a graphical user interface. A programming language description of a computation element for an execution unit of the processor extension is accessed. A representation of a hardware design for the processor extension comprising the instruction format and the computation element is generated.

In accordance with another embodiment of the present invention, a graphical user interface for generating a processor extension comprises a first window for selecting an instruction format from a plurality of allowable instruction formats and a second window for displaying a programming representation of an operation to be performed by the processor extension.

Major advantages of the present invention are afforded by easy creation of instruction-set extension modules interfacing with existing embedded processor designs. Embodiments in accordance with the present invention hide the register transfer level (RTL) implementation, module interface and communication details from the designer by the novel use of an ease of use layer.

Using embodiments of the present invention, designers can quickly develop application specific instructions to extend processor cores for improved performance and differentiation. Designers may optimize user-defined instructions for high performance processors. Using embodiments of the present invention, designers can quickly and graphically define the behavior of the new instructions. Pipeline interactions of the instructions with the main processor can also be defined.

Additional advantages afforded by embodiments in accordance with the present invention enable the data path behavior of an extension module to be explicitly distributed over multiple pipeline stages. A separate editable window for each of the pipeline stages may be utilized to define such behavior.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

FIG. 3 illustrates an instruction editor window, in accordance with embodiments of the present invention.

FIG. 4A illustrates a code segment, in accordance with embodiments of the present invention.

FIG. 4B illustrates a representation of a computation element for an execution unit, in accordance with embodiments of the present invention.

DETAILED DESCRIPTION OF THE INVENTION

Figure 1:
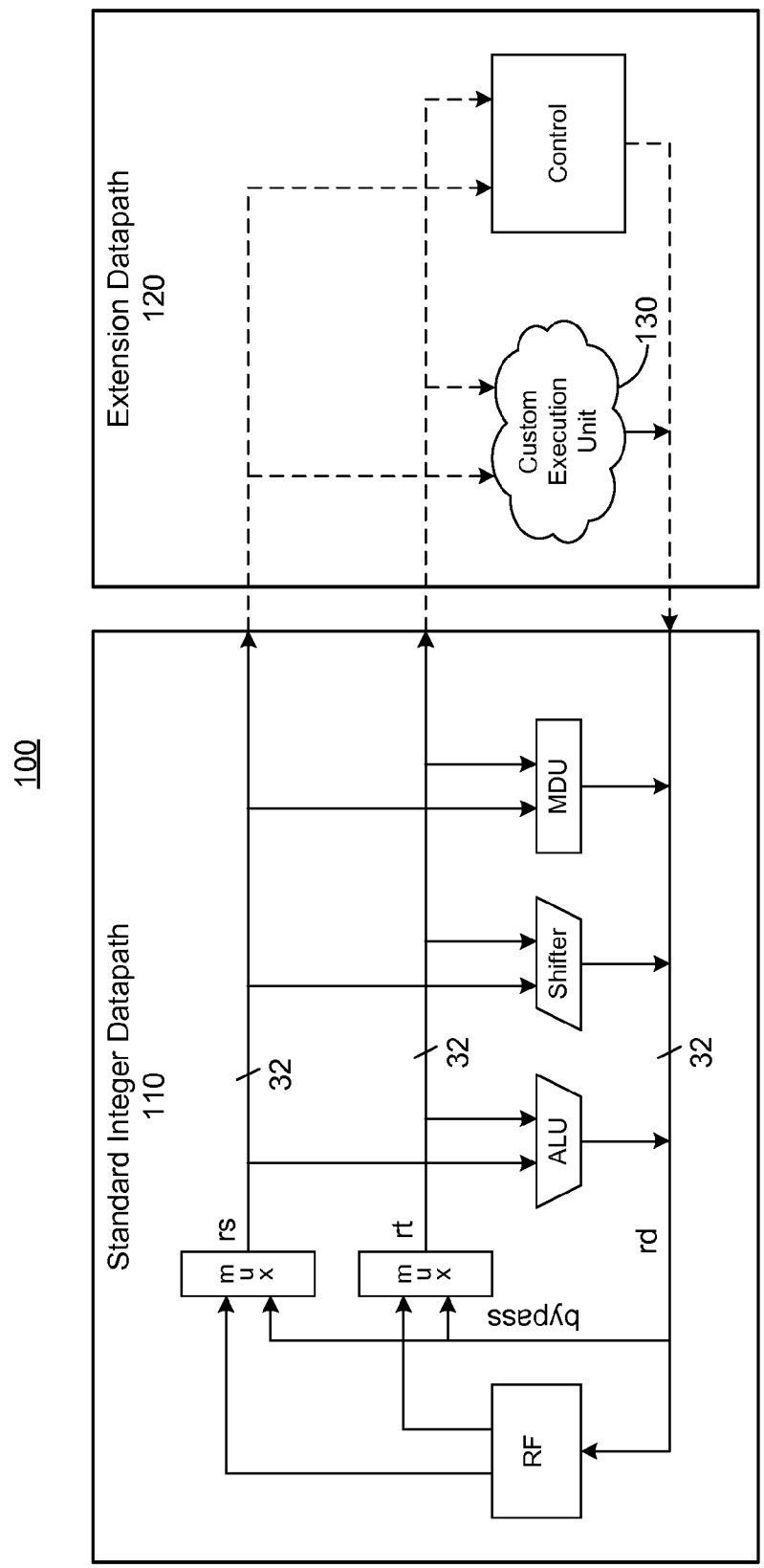
FIG. 1 illustrates a simplified block diagram of an exemplary processor and a processor extension module, in accordance with embodiments of the present invention.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow (e.g., processes 600 and 700) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "requesting" or "performing" or "querying" or "sending" or "accessing" or "commanding" or "storing" or "dividing" or "computing" or "testing" or "calculating" or "determining" or "measuring" or "adjusting" or "generating" or "comparing" or "synchronizing" or "accessing" or "retrieving" or "conveying" or "resuming" or "installing" or "gathering" or the like, refer to the action and processes of a computer system, or similar electronic computing device" that manipulates and transforms data represented as physical (electronic) quantities within the computer system's registers and memories into other data similarly represented as physical quantities within the computer system memories or registers or other such information storage, transmission or display devices.

User Interface for Facilitation of High Level Generation of Processor Extensions FIG. 1 illustrates a simplified block diagram 100 of an exemplary processor and a processor extension module, in accordance with embodiments of the present invention. Section 110 illustrates a standard integer data path, e.g., a standard part of a processor core. Section 120 illustrates an extension data path, e.g., circuitry to implement a customized processor function that is in addition to the standard processor core functions.

Typically, an execution unit, e.g., circuitry to implement a new or customized processor instruction, is designed based upon a computation element and a set of control logic to control the data flowing through the computation element. Custom Execution Unit 130 of FIG. 1 illustrates an exemplary execution unit. For example, the control logic is responsible for defining the number of pipeline stages and the direction(s) of the pipeline stages. The computation element comprises the logic that operates on the data, for example, a computation element that performs a multiplication of two words of data. The computation element is sometimes known as or referred to as the data path.

The design of an abstract representation of a computation element is well suited to representation in a high level programming language, e.g., the C programming language. In general, a computation element performs an operation on a piece of data. For example, in a high level programming language operation, there is generally no concept of timing, and there is no dependency on specific hardware.

In contrast, high level programming languages are generally not well suited to describing control logic, pipelines and their operations. For example, pipelines typically include both sequential and parallel characteristics, and generally involve timing dependent data movement. Further, control logic is typically very hardware specific, e.g., in accessing a specific processor core register.

In accordance with embodiments of the present invention, the design of computation elements is separated from the design of data paths. For example, a graphical user interface for generation of processor extensions can present a user with a set of pre-defined, fixed control structures. Control structures generally correspond to available forms or formats of allowable instructions. The processor IP vendor, utilizing the unique skills required for the design of such control circuitry, typically designs such control structures. The set of available control structures should include sufficient types, e.g., control structures for two and three pipeline stage execution units, to support a wide range of possible execution units.

Figure 2:
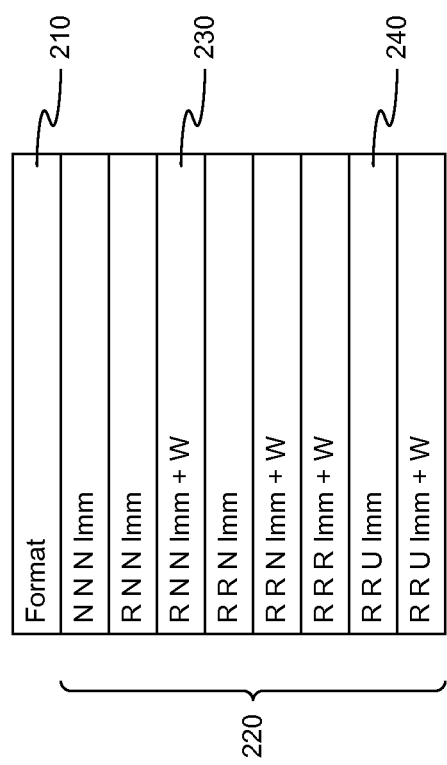
FIG. 2 illustrates an instruction format window, in accordance with embodiments of the present invention.

FIG. 2 illustrates an instruction format window 200, in accordance with embodiments of the present invention. Window 200 may be displayed on a computer screen, e.g., a video display monitor, for interaction with and by a user, e.g., with a cursor directing device. Instruction format window 200 provides a user with a graphical user interface for selecting and establishing the number and type of operands to be used by an extension instruction. Generally, a list is provided to enable a user to select from among all allowed formats. For example, a user created instruction may access multiple standard core registers, one or more registers in an extension module and/or immediate values. Such available formats may be selectable by the individual components of an instruction, e.g., selecting core registers to be used separately from selecting new registers to be used separately from selecting other instruction characteristics. Alternatively, an available format may be selected from a list of possible permutations of instruction component combinations.

Instruction format window 200 comprises a window title 210, and an exemplary list 220 of available instruction formats. The elements of the entries in exemplary available instruction format list 220 describe characteristics of the instructions. For example, in format description 230, "R N N" indicates the use of one core register, "Imm" indicates the use of an immediate value and "+W" indicates that the instruction will write back a result value. The "U" in format description 240 indicates the use of a new or "user" register in an extension module. It is to be appreciated that embodiments in accordance with the present invention are well suited to other descriptions of allowable instruction formats.

An optional color coding may be incorporated into a list of available instruction formats. For example, the color green may be used to indicate instructions that read from a register, the color red may be used to indicate instructions that write to a register. Both colors may be used to indicate instructions that both read and write to registers, e.g., within an instruction format description, read only registers may be indicated in green, write or read/write registers may be indicated in red. The use of such color coding may beneficially improve usage of such window tools.

FIG. 3 illustrates an instruction editor window 300, in accordance with embodiments of the present invention. Instruction editor window 300 may be screen displayed and comprises a field for an instruction name 310 ("CLIP"). In the exemplary embodiment of FIG. 3, instruction name field 310 is part of a hierarchical list structure, e.g., the instruction "CLIP" is part of the set of instructions "Clipping."

Instruction editor window 300 further comprises a field for a description of the instruction 320 ("Truncates a value max 88") and a field for the format of the instruction 315. It is to be appreciated that field for the format of the instruction 315 derives from instruction format window 200 as instruction formats are selected. In the exemplary embodiment of FIG. 3, all instructions of the set "Clipping" are of the same format, e.g., format description 230 (FIG. 2).

As an instruction defined by format description 230 (FIG. 2) utilizes an immediate value, instruction editor window 300 further comprises a field 330 for assigning the immediate value ("88"). Field 330 may not be displayed or available for entry for instruction formats that do not require an immediate value. Field 340 displays the opcode of the instruction being edited. In accordance with embodiments of the present invention, an unused opcode may be assigned to a newly created instruction and displayed in field 340 automatically under software control. Such automatic assignment is advantageous since software developers often utilize high level languages, e.g., the C programming language, and are oftentimes unfamiliar with a processor's complete opcode set.

FIG. 4A illustrates an exemplary code segment 400, e.g., a portion of a desirable software program written in the C programming language, in accordance with embodiments of the present invention. For example, code segment 400 may be a frequently executed portion of software for implementing a digital signal processing task. Exemplary code segment 400, when executed, filters values of variable "index" to fall within the range of greater than or equal to zero and less than or equal to 88.

FIG. 4B illustrates a representation 450 of a computation element for an execution unit, in accordance with embodiments of the present invention. Representation 450 is illustrated using the C programming language syntax. It is appreciated that with embodiments in accordance with the present invention are well-suited to other programming languages.

Representation 450 comprises a prolog segment 460, an epilog segment 470 and a function segment 480. Prolog segment 460 comprises programming language instructions to access the values, e.g., register contents and/or immediate values, that will be operated upon. In this example, the name "UDI_RS" is a special keyword representing a core register known as "RS." Similarly, the name "UDI_IMM"" is a special keyword representing an immediate value. The result of the execution of the prolog segment 460 instructions is to equate the variable name "index" with the value of the core register "RS," and to equate the variable name "bound" with the immediate value supplied in the instruction operand.

Function segment 480 provides programming language instructions for the execution of operations upon the data. In the exemplary embodiment of FIG. 4B, it is appreciated that function segment 480 is identical to code segment 400 (FIG. 4A). Epilog segment 470 provides programming language instructions for writeback of the results of the operations performed by function segment 480. The name "UDI_WRITE_GPR" is a function call to perform the writeback operation.

Figure 5:
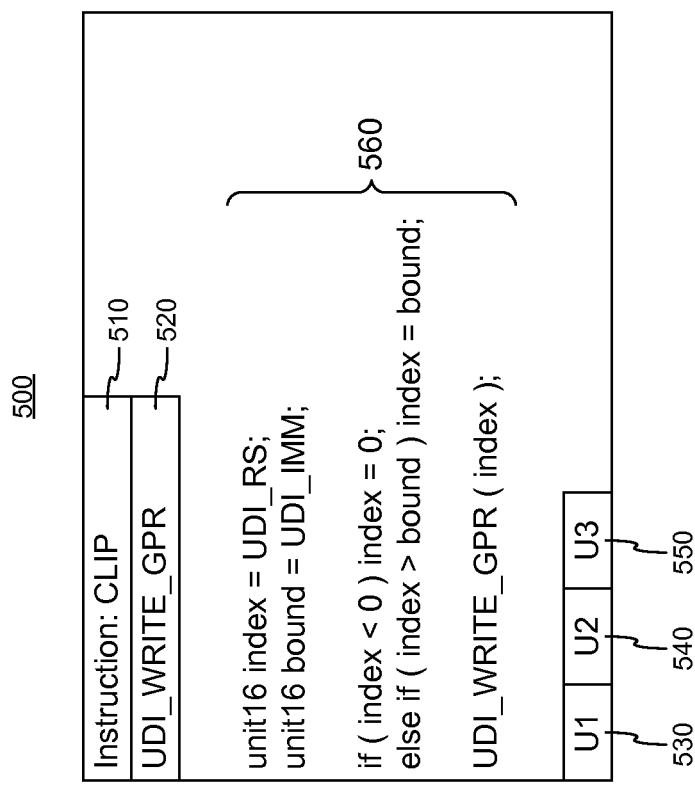
FIG. 5 illustrates a data path editor window, in accordance with embodiments of the present invention.

FIG. 5 illustrates a data path editor window 500, in accordance with embodiments of the present invention. Data path editor window 500 may be screen displayed and generally provides for input, selection and display of a high level representation of a data path portion, e.g., an execution portion, of an extension module.

Data path editor window 500 comprises a field 510 for display of an instruction name, e.g., "CLIP." Data path editor window 500 comprises an editable display 560 of a representation of a computation element. In the exemplary embodiment of FIG. 5, representation 450 (FIG. 4B) is shown displayed in editable display 560.

Field 520 of data path editor window provides a listing of all available keywords, e.g., "UDI_RS," "UDI_WRITE_GPR" and the like, for selection and insertion into editable display 560.

Data path editor window 500 further comprises a plurality of pipeline stage selection fields, e.g., pipeline stage selection field 530 corresponding to pipeline stage U1, pipeline stage selection field 540 corresponding to pipeline stage U2 and pipeline stage selection field 550 corresponding to pipeline stage U3. The pipeline stage selection fields 530-550 enable a designer to specify the pipeline, e.g., clock, stage to be used for the execution of the portions of a new extension instruction. It is to be appreciated that not all instruction types may be executable at a specified pipeline stage.

Figure 6:
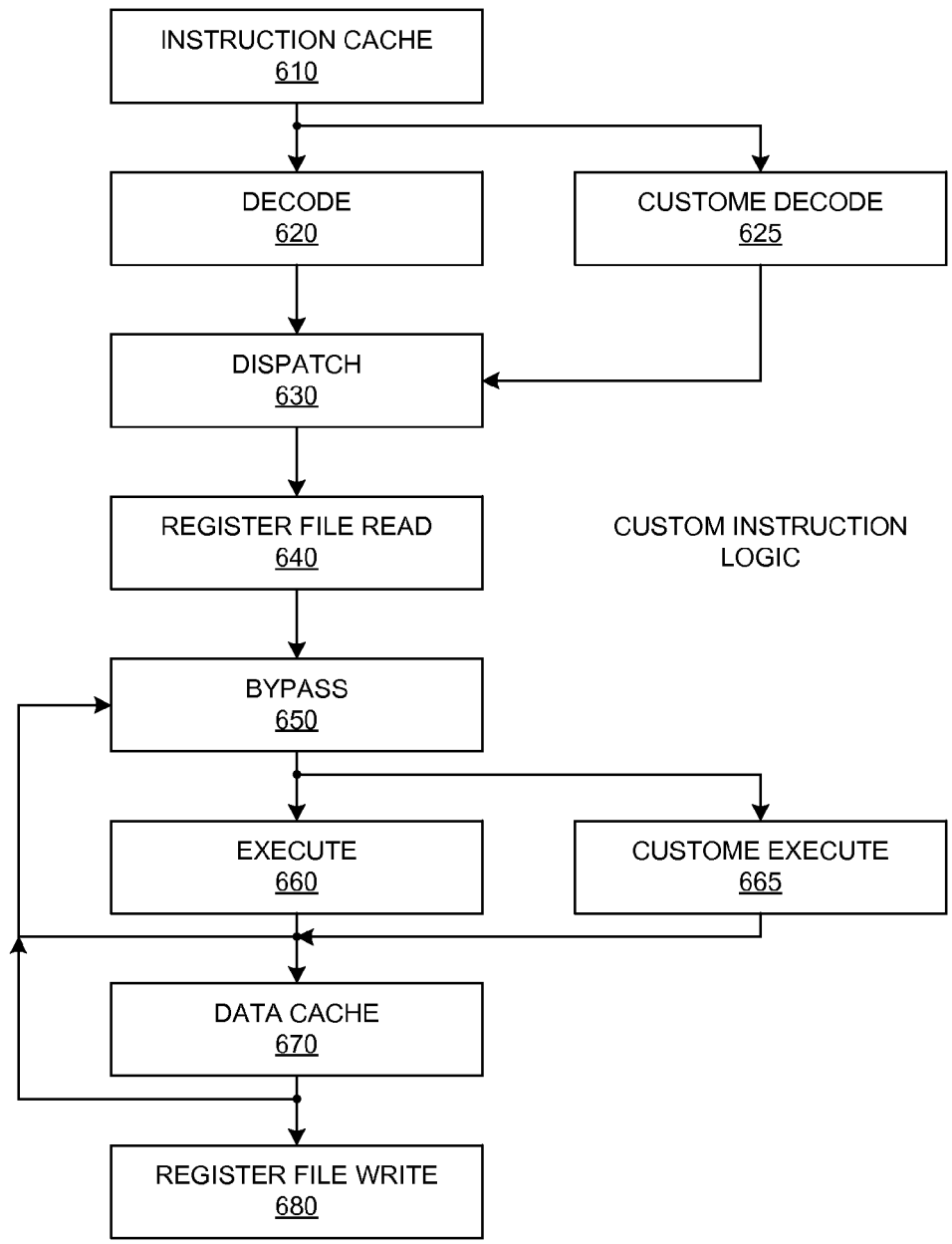
FIG. 6 illustrates an exemplary pipeline flow for a customized processor, in accordance with embodiments of the present invention.

FIG. 6 illustrates an exemplary pipeline flow 600 for a customized processor, in accordance with embodiments of the present invention. Each stage may correspond to a single clock cycle, although it is appreciated that this is not a requirement for all types of processors, e.g., complex instruction set computer (CISC) processors. A typical pipeline flow begins with obtaining 610 an instruction from an instruction cache. The instruction is decoded, 620. The various portions of the instruction, e.g., opcode, operands, etc., are dispatched, 630.

Registers are accessed, 640. The instruction is executed, 660. If an instruction requites more time than is available in a single stage time, e.g., a single clock cycle, flow may bypass 650 for a number of stage times or cycles required to complete the execution. Results are placed 670 in a data cache and registers are written back 680.

In accordance with embodiments of the present invention, an extension instruction may be executed in a similar manner. An extension instruction is decoded in 625 and custom circuitry, e.g., within custom execution unit 130 (FIG. 1), executes at 665.

As described previously with respect to pipeline stage selection fields 530-550 (FIG. 5), it is to be appreciated that not all instruction types may be executable at a specified pipeline stage. Further, for a variety of reasons, it may be desirable to execute portions of a computation element on different pipeline stages. The novel pipeline stage selection fields 530-550 enable a designer to specify portions of a computation element, e.g., lines of programming language instructions such as shown in editable display 560 (FIG. 5), to be executed on each available pipeline stage. As a beneficial result, operation flow may bypass 650 for a number of stage times or cycles required to complete the custom execution.

Figure 8:
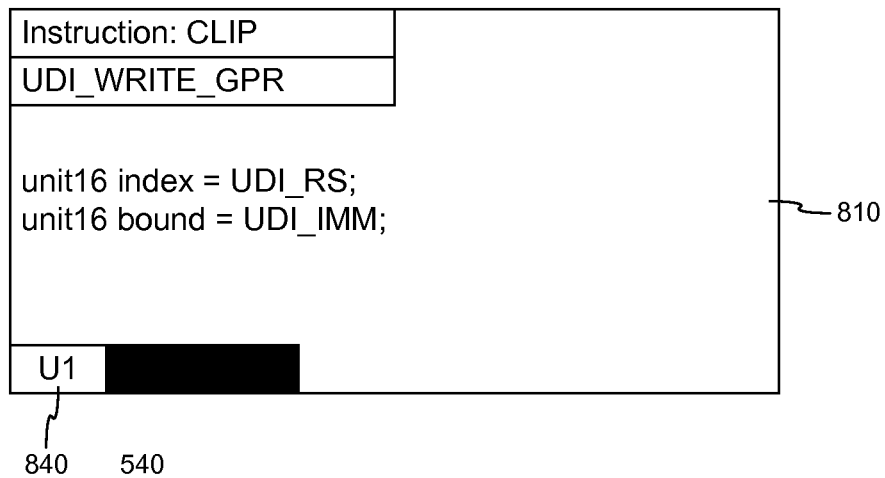
FIG. 8 illustrates a plurality of editable data path editor windows, in accordance with embodiments of the present invention.
Figure 8:
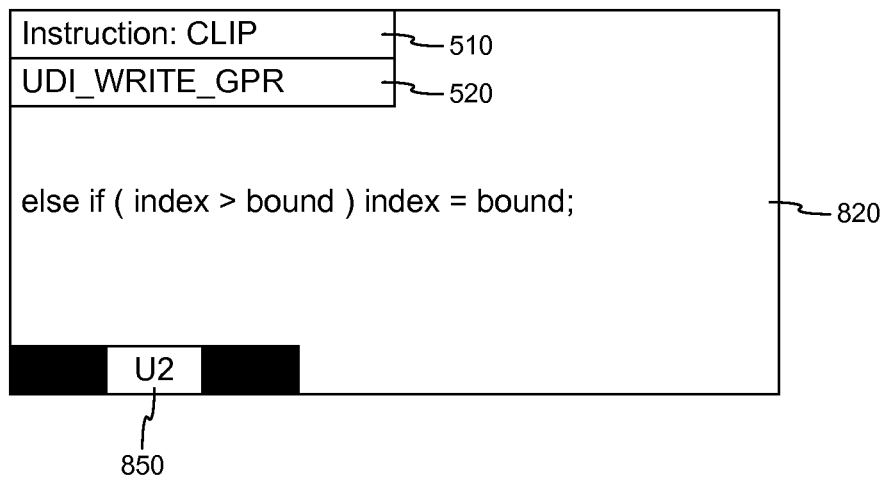
Figure 8:
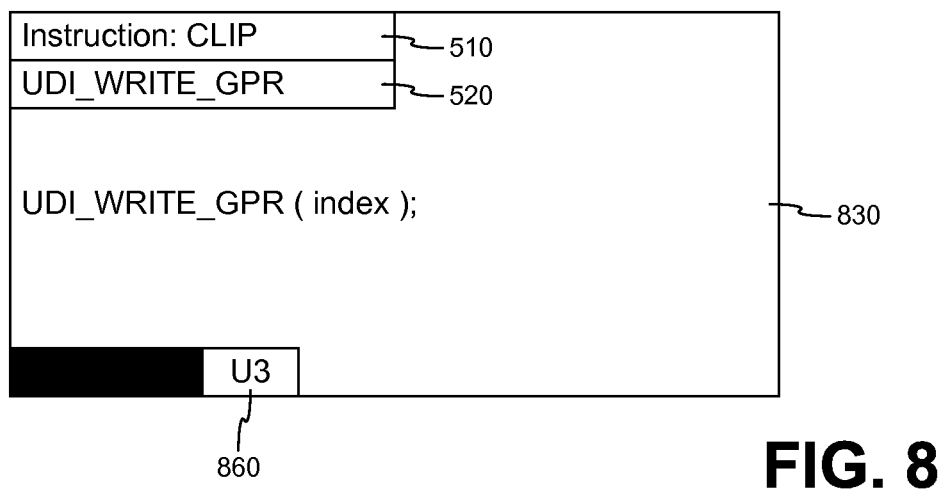

FIG. 8 illustrates a plurality 800 of editable data path editor windows, in accordance with embodiments of the present invention. Each editable data path editor window of plurality 800 is generally analogous to data path editor window 500 of FIG. 5. Plurality of windows 800 may be screen displayed and generally provide for input, selection and display of a high level representation of a data path portion of an extension module and assignment of that data path portion to a particular pipeline stage.

For example, in consideration of representation 450 of a computation element for an execution unit (FIG. 4B), FIG. 8 illustrates an assignment of portions of that computation element to a plurality of pipeline stages. Window 810 displays the first line of programming language instructions ("If (index<0) index=0;"). This line is indicated as executing during a first pipeline stage, e.g., via the display of pipeline stage selection field 840, corresponding to a second pipeline stage. If such a line was not assigned to a pipeline stage, an assignment may be made, e.g., by "clicking" on the desired pipeline stage selection field.

Similarly, the second line of programming language instruction ("else if (index>bound) index=bound;") may be displayed as executing on a second pipeline stage as shown in window 820 highlighting pipeline selection field 850, corresponding to a second pipeline stage, and the third line of programming language instruction may be indicated to execute on a third pipeline stage, as shown in window 830, highlighting pipeline selection field 860, corresponding to a third pipeline stage. The first 810, second 820 and third 830 instances of an editable display may be windowed Thus, the data path behavior of an extension module may be explicitly distributed over multiple pipeline stages. In this novel manner, a designer may control the resulting efficiency of the extension module design in terms of clock speed, execution performance, integrated circuit area and the like.

Figure 7:
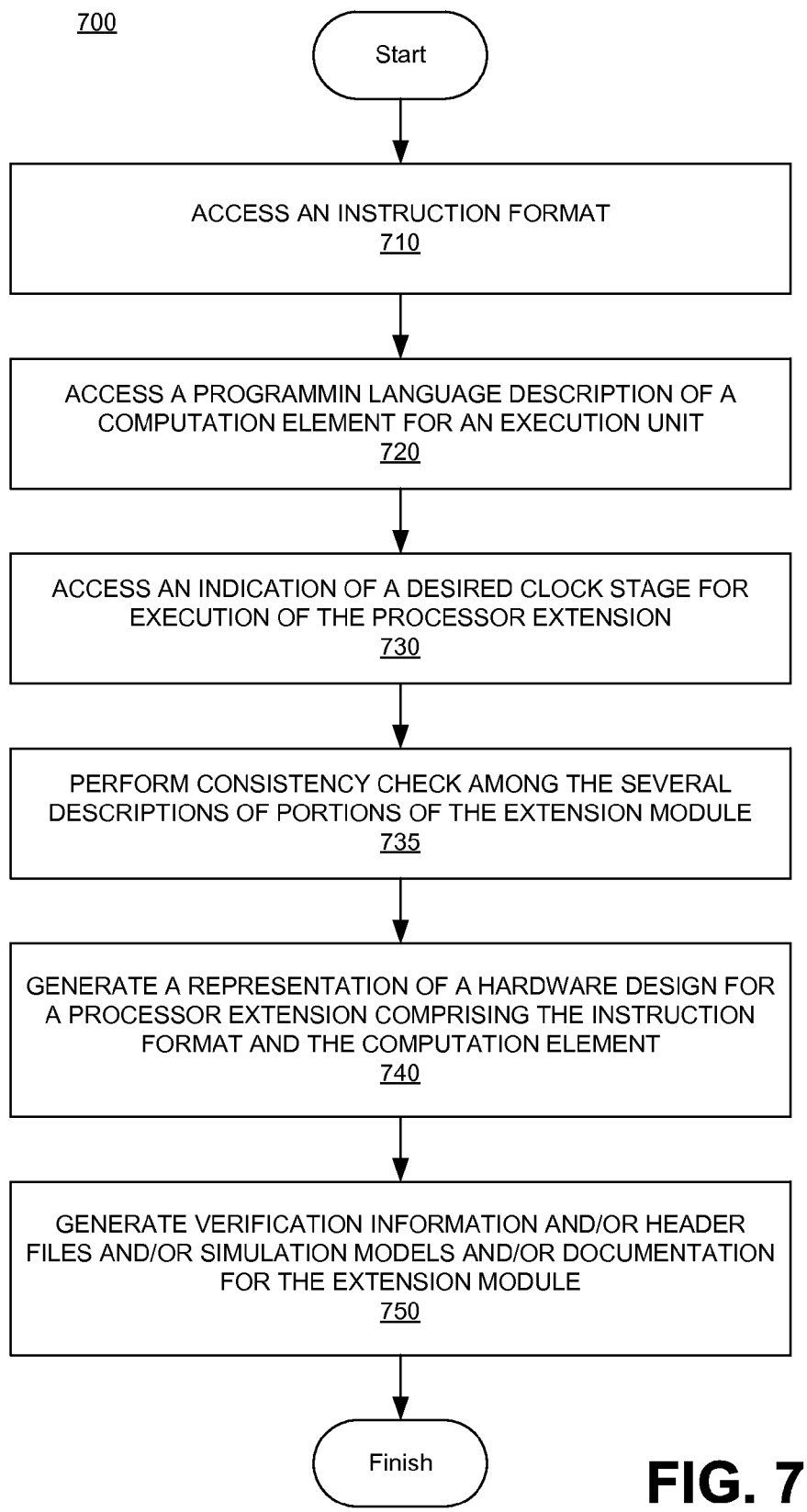
FIG. 7 is a flow chart of a method for generating a processor extension from a high level description, in accordance with embodiments of the present invention.

FIG. 7 is a flow chart of a method 700 for generating a processor extension from a high level description, in accordance with embodiments of the present invention. In 710, an instruction format is accessed. The selected instruction format may be an entry in a list of a plurality of allowable instruction formats. For example, a designer indicates and selects format description 230 within instruction format window 200 (FIG. 2).

Alternatively, the instruction format may be accessed via other than graphical means. For example, embodiments in accordance with the present invention are well suited to specification and/or accessing an instruction format in a textual form. For example, an instruction format may be accessed via a command line "switch," e.g., in an "UNIX" environment. Similarly, an instruction format may be specified within a command string, e.g., in a "batch" file. Embodiments in accordance with the present invention are well suited to other computer implemented methods of access a wide range of types of representations.

In 720, a programming language description of a computation element for an execution unit is accessed. For example, a designer enters programming language instructions into editable display 560 (FIG. 5). In optional 730, an indication of a desired pipeline stage for execution of the processor extension is accessed.

In accordance with embodiments of the present invention, a consistency check may be performed among the several descriptions of portions of an extension module. Such consistency checking may prevent a user from making errors that are generally very difficult to locate under the conventional art.

For example, in consideration of instruction format 230 (FIG. 3), an exemplary consistency check may confirm that an immediate value is specified in immediate value field 330 (FIG. 3), as format 230 specifies that an immediate value will be used by the instruction. In addition, the consistency check should confirm that the corresponding computation element, e.g., as displayed in data path editor window 500 (FIG. 5), comprises the special keyword "UDI_WRITE_GPR( )," as format 230 specifies that the instruction will write back a result value.

In optional 735, a consistency check is performed among the several descriptions of portions of the extension module.

In 740, an automated software process generates a representation of a hardware design for a processor extension comprising the instruction format and the computation element.

In accordance with other embodiments of the present invention, an automated software process can generate a variety of other electronic information useful in, for example, the development, implementation, testing and/or exploitation of an extension module. For example, an automated software process can generate information for use in a verification environment, for example, with the system design software commercially available under the trademark CONVERGENSC®, from CoWare, Inc. of San Jose, Calif.

Similarly, an automated software process can generate header files for use, e.g., by complier and electronic design automation tools, which may enhance implementation of the extension within a design flow. In addition, an automated software process can generate simulation models for cycle accurate simulation of the processor extension. In accordance with an embodiment of the present invention, the simulation models may be in the "C" language or compatible with "System C." Further, an automated software process can generate documentation to describe the extension's behavior, for example, for use in a programming guide that instructs a programming in usage of new instructions implemented by an extension module.

In optional 750, an automated software process can optionally generate one or more of the above described data sets.

In this novel manner, embodiments in accordance with the present invention are operable to generate register transfer level (RTL) and/or hardware description language (HDL) descriptions for an extension instruction from a high level description of the extension instruction. It is appreciated that a user of such embodiments does not deal with RTL or HDL, and does not need to understand such hardware-oriented languages.

In summary, embodiments of the present invention provide systems and methods of user interface for facilitation of high level generation of processor extensions. In addition, systems and methods of user interface for facilitation of high level generation of processor extensions are provided that abstract the register transfer level (RTL) implementation details. Further, systems and methods of user interface for facilitation of high level generation of processor extensions are provided that are compatible and complimentary with conventional integrated circuit layout systems and methods.

Embodiments in accordance with the present invention are thus described. While the present invention has been described in particular embodiments, it should be appreciated that the present invention should not be construed as limited by such embodiments, but rather construed according to the below claims.

What is claimed is:

1. A computer implemented method comprising:
   receiving a request to generate a processor extension from a high level description, the processor extension for extending an instruction set of a processor, the processor extension for executing an extension instruction;
   generating a first window on a graphical user interface comprising a plurality of instruction formats representing available instruction types, wherein the instruction formats specify a number of operands and type of operands of the extension instruction, the first window operable to allow user selection of a selected instruction format, wherein the selected instruction format specifies characteristics of the extension instruction to be implemented by a hardware of the processor extension;
   generating a second window on a graphical user interface comprising editable instruction fields for defining the extension instruction, the extension instruction extending the instruction set of the processor based on the selected instruction format;
   generating a third window on a graphical user interface operable to display an editable description of the extension instruction, the editable description of the extension instruction describing the execution of the extension instruction to be implemented by the hardware of the processor extension, the editable description written in a programming language other than a hardware description language (HDL); and
   generating, by a computer, a representation of a hardware design of the processor extension based on the extension instruction and the description of the extension instruction, the hardware design of the processor extension implementing the editable description of the extension instruction written in the programming language, the processor extension comprising the instruction format and a computational element that implements the extension instruction.

2. The method of claim 1 wherein the instruction formats comprise a number and type of operands to be used by the extension instruction.

3. The method of claim 1 wherein the third window comprises a plurality of pipeline stage indictors operable to assign operation of the computation element to corresponding processor pipeline stages.

4. The method of claim 1 wherein the plurality of instruction formats are predetermined.

5. The method of claim 1 wherein said third window is operable to accept user entry of programming language statements.

6. The method of claim 5 wherein the programming language comprises a version of the C programming language.

7. The method of claim 1 wherein the representation of a hardware design of the processor extension is generated in a version of hardware description language.

8. The method of claim 1 wherein the representation of a hardware design of the processor extension is generated in a version of register transfer level language.

9. The method of claim 1 further comprising checking the selected instruction format and the description of the extension instruction for consistency.

10. The method of claim 1 wherein the plurality of instruction formats of the first window are color coded to indicate attributes of respective instruction formats.

11. The method of claim 1 further comprising generating verification information for the processor extension.

12. The method of claim 1 further comprising generating header files for the processor extension.

13. The method of claim 1 further comprising generating simulation models for the extension module.

14. The method of claim 13 wherein the simulation models are in a version of the C programming language.

15. The method of claim 1 further comprising generating documentation for the processor extension.

16. The method of claim 1 wherein the processor extension further comprises:
a custom execution unit; and
a control unit coupled to said custom execution unit.

17. The method of claim 16 further comprising generating an extended processor integrating said processor extension with said standard processor core wherein said extended processor cooperatively executes said extension instruction within a program flow of instructions of said standard processor core.

18. A non-transitory computer readable medium configured to store instruction, the instructions when executed by a processor cause the processor to:
receive a request for generating a processor extension from a high level description, the processor extension for extending an instruction set of a target processor, the processor extension for executing an extension instruction;
generate a first window on a graphical user interface comprising a plurality of instruction formats representing available instruction types, wherein the instruction formats specify a number of operands and types of operands of the extension instruction, the first window operable to allow user selection of a selected instruction format, wherein the selected instruction format specifies characteristics of the extension instruction to be implemented by a hardware of the processor extension;
generate a second window on a graphical user interface comprising editable instruction fields for defining the extension instruction, the extension instruction extending the instruction set of the target processor based on the selected instruction format;
generate a third window on a graphical user interface operable to display an editable description of the extension instruction, the editable description of the extension instruction describing the execution of the extension instruction to be implemented by the hardware of the processor extension, the editable description written in a programming language other than a hardware description language (HDL); and
generate a representation of a hardware design of said processor extension based on the extension instruction and the description of the extension instruction, the hardware design of the processor extension implementing the editable description of the extension instruction written in the programming language, the processor extension comprising the instruction format and a computational element that implements the extension instruction.

19. The non-transitory computer readable medium of claim 18 wherein the third window comprises a plurality of pipeline stage indictors operable to assign an operation of the computation element to corresponding processor pipeline stages.

20. The non-transitory computer readable medium of claim 18 wherein the plurality of instruction formats are predetermined.

21. The non-transitory computer readable medium of claim 18 wherein the third window is operable to accept user entry of programming language statements.

22. The non-transitory computer readable medium of claim 21 wherein the programming language comprises a version of the C programming language.

23. The non-transitory computer readable medium of claim 18 wherein the representation of a hardware design of the processor extension is generated in a version of hardware description language.

24. The non-transitory computer readable medium of claim 18 wherein the representation of a hardware design of the processor extension is generated in a version of register transfer level language.

25. The non-transitory computer readable medium of claim 18 further comprising instruction that cause the processor to:
check the selected instruction format and the description of the extension instruction for consistency.

26. The non-transitory computer readable medium of claim 18 wherein the plurality of instruction formats of the first window are color coded to indicate attributes of respective instruction formats.

27. The non-transitory computer readable medium of claim 18 further comprising instruction that cause the processor to:
generate verification information for the processor extension.

28. The non-transitory computer readable medium of claim 18 further comprising instruction that cause the processor to:
generate header files for the processor extension.

29. The non-transitory computer readable medium of claim 18 further comprising instruction that cause the processor to:
generate simulation models for the extension module.

30. The non-transitory computer readable medium of claim 29 wherein the simulation models are in a version of the C programming language.

31. The non-transitory computer readable medium of claim 18 further comprising instruction that cause the processor to:
generate documentation for the processor extension.

32. The non-transitory computer readable medium of claim 18 wherein the processor extension further comprises:
a custom execution unit; and
a control unit coupled to said custom execution unit.

33. The non-transitory computer readable medium of claim 32 further comprising instruction that cause the processor to:
generate an extended processor integrating the processor extension with the standard processor core, the extended processor cooperatively executing the extension instruction within a program flow of instructions of the standard processor core.

* * * * *